July 7, 1942.  G. E. ROWE  2,289,046
METHOD OF AND APPARATUS FOR FORMING GLASSWARE
Filed July 19, 1939  7 Sheets-Sheet 2

Fig. 2.

Witness
W. B. Thayer.

Inventor
George E. Rowe
by Brown & Latham
Attorneys

July 7, 1942.    G. E. ROWE    2,289,046
METHOD OF AND APPARATUS FOR FORMING GLASSWARE
Filed July 19, 1939    7 Sheets-Sheet 4

Inventor
George E. Rowe
by Brown + Parham
Attorneys

Witness
W. B. Thayer

July 7, 1942.                    G. E. ROWE                   2,289,046
                METHOD OF AND APPARATUS FOR FORMING GLASSWARE
                        Filed July 19, 1939          7 Sheets-Sheet 6

Witness
W. B. Thayer.

Inventor
George E. Rowe
by Brown & Parham
Attorneys

July 7, 1942.  G. E. ROWE  2,289,046
METHOD OF AND APPARATUS FOR FORMING GLASSWARE
Filed July 19, 1939  7 Sheets-Sheet 7

Witness
W. B. Thayer.

Inventor
George E. Rowe
By Brown + Parham
Attorneys

Patented July 7, 1942

2,289,046

UNITED STATES PATENT OFFICE 2,289,046

METHOD OF AND APPARATUS FOR FORMING GLASSWARE

George E. Rowe, Wethersfield, Conn., assignor to Hartford-Empire Company, Hartford, Conn., a corporation of Delaware Application July 19, 1939, Serial No. 285,260

24 Claims. (Cl. 49—5)

This invention relates to the manufacture of glass containers, particularly as accomplished by forming separate charges, such as are produced by an automatic feeder, into hollow parisons in parison molds and subsequently blowing the parisons in blow molds to produce articles of the shapes desired.

It is characteristic of prior methods of this general character, that each mold charge is caused to come to rest so that all the glass of such charge is quiescent for a definite period of time prior to the formation of the charge into the parison desired, during which time at least part of the charge is being chilled externally by reason of being in good heat transferring relation with an external molding or confining surface.

One prior method that is extensively employed in the manufacture of containers, particularly those of the narrow neck type, is the well-known blow-and-blow method. In the use of this prior method, the charge is delivered to an inverted parison mold in which it is compacted into chilling contact with the mold walls by the settle blow which is required for the formation of the neck finish portion of the parison. The glass charge necessarily remains at rest in this external chilling contact with the mold walls for a definite period of time—long enough for withdrawal of the neck pin to leave a counterblow hole in the neck finish and for necessary "corkage reheat" prior to the counterblowing operation. The counterblowing operation causes continuation of the chilling of the glass that has already been chilled for this definite period of time and also forces hotter glass from the interior of the charge into first chilling contact with the walls of the previously unoccupied upper portion of the inverted parison mold. In consequence, the walls of the portion of the parison that has been formed by the counterblow receive much less external chilling than the walls of the remainder of the parison. This condition produces the so-called "settle blow waves" or "counterblow waves" in the walls of the finally blown article.

Other types of containers, particularly those having wider mouths, are generally made by a press-and-blow process which also produces ware having wavy walls. In the use of this prior press-and-blow process, a charge of glass is delivered to an upright parison press mold which is closed at its bottom. The glass charge fills the cavity of the press mold for part of its height—to a level usually termed the "fill line"—and comes to rest so as to be subjected to some chilling at its exterior prior to a pressing operation. The pressing operation is performed by thrusting a pressing plunger axially downward into the glass in the press mold, causing relatively hot and less viscous glass from the interior of the charge to be forced upwardly around the plunger to fill the previously unoccupied upper portion of the press mold but at the same time causing a continuation of and a substantial increase in the chilling of the glass that has remained at rest in the lower portion of the mold cavity since the delivery of the charge to such cavity. This condition causes the article into which the pressed parison is subsequently blown to have wavy walls, as in the case of the article produced by the blow-and-blow process.

These defects of glassware produced by prior methods have been long known and many attempts have been made to overcome or cure them. In general, such attempts have proceeded on the theory that the characteristic stages of the prior methods for the production of parisons are to be retained and that the defects inherent therein may be minimized or reduced by various refinements or improvements in the prior charge feeding operations and/or in the subsequent molding operations. These attempts have not solved the problem since, in actual practice, most of the glassware made of separate charges has defects such as above referred to and which are inherent in the parison-forming methods employed. These defects militate against or preclude desirable reduction in the weight of final articles and therefore have become increasingly objectionable with the advent of and increase in the demand for glassware having thinner walls and of lighter weight.

An object of the invention is to make glass containers of practically all commercial kinds, including narrow-necked ware, wide-mouthed ware, semi-wide-mouthed ware, etc., of better quality than has been practically possible by the use of prior methods.

Another object of the invention is to provide a method of and apparatus for forming separate charges of molten glass, such as may be obtained from a modern, efficient feeder, into glass containers having wave-free walls.

A further object of the invention is to provide a novel method by which various kinds of articles, such as narrow-necked ware which previously have been made from feeder-fed charges only by blow-and-blow processes, can be made by a press-and-blow process or mode of operation and this with important advantages over prior methods of making such articles.

A further object of the invention is to provide dependable, flexible, relatively rapid and generally efficient apparatus for forming successive similar charges of molten glass into like articles of glassware of high quality and generally good appearance.

A more specific object of the invention is to provide in a method of the character described a mode of treatment of each of a series of similar charges so as to form each such charge quickly into a pressed hollow blank or parison having a neck finish or finished rim portion at its lower end and a substantially uniformly chilled skin or outer surface at all places throughout the surface area of the body thereof.

Another relatively specific object of the invention is to provide a method of and means for receiving and acting on a falling charge of molten glass so as to check the fall of the charge at a predetermined desirable place with relation to the cavity of an inverted parison press mold and neck mold assembly and on or above the tip of an upwardly movable cooperative vertical pressing plunger, and before the glass of the charge has assumed or been forced into intimate heat transferring relation with any external glass chilling surface, reversing the movement of the charge or of the major portion thereof by an upward movement of the plunger to press the charge against the walls of the cavity of the parison press mold and neck mold assembly to produce a hollow glass parison having a neck finish or finished rim portion at its lower end and having a body portion provided with a substantially uniformly chilled skin or outer surface.

Another relatively specific object of the invention is to form a charge of molten glass into a pressed hollow parison or article having a neck finish portion or finished rim in such a way and by such means that glass of the charge will be continuously in motion and kept from any substantial glass chilling or heat transferring contact with an external supporting or molding surface from the time the charge is delivered to a charge receiving and parison pressing mechanism of the invention until such charge has been pressed in such mechanism to the shape of the parison or article desired.

Other objects and advantages of the invention will hereinafter be pointed out or will become apparent from the following description of a number of illustrative ways of and means for carrying the invention into effect.

Charges appropriate in size, shape and thermal condition for the particular article to be made during any given operating period should be delivered to the charge receiving and parison pressing mechanism of the invention at accurately timed and predetermined regular intervals. The invention therefore involves use of an efficient feeder having the requisite operating characteristics and capabilities. One feeder that is adapted for such use is the well known Hartford single feeder.

Each charge produced and delivered by such a feeder moves by gravity, either by falling freely through the air or by being guided through or along a suitable charge delivering chute or trough mechanism, to the associate forming machine. In each instance, the charge is kept free from harmful differential chilling and deformation up to the time of its delivery to the machine.

In carrying out the invention, the fall or downward bodily movement of a charge as above described is checked at a predetermined level in such a way and by such means that the charge will be disposed on or above an upwardly movable vertical pressing plunger in a desirable relation to the cavity of an inverted parison press mold and neck ring assembly.

According to one mode of operation of the present invention, the fall of such a charge may be checked in a temporary receiver below and in axial alignment with the neck ring. This mode of operation is appropriate for and advantageously usable in the production of glass articles having relatively wide mouths. In another use of the invention, the fall or descent of the charge may be checked when all or the major part of the charge is above the level of the neck ring and within the confines of the parison press mold. This mode of operation is especially suitable for use in the production of narrow necked articles and semi-wide-mouthed articles although it also may be used for wide-mouthed ware. In locating the charge at the place just referred to, the parison press mold may be formed of relatively movable body sections and a cooperative movable bottom plate, the body sections being closed before the receipt of the charge and the bottom plate being placed in its operative position at the top of the inverted press mold as quickly as possible thereafter.

In still another way of using the invention, the fall or descent of the charge may be checked at some intermediate level between those above mentioned, a receiver being employed below and in axial alignment with the neck ring whenever a sufficient portion of the glass of the charge is disposed below the level of the neck ring at the time its fall or descent is checked to make the use of such a receiver desirable.

In all the above mentioned ways of utilizing the invention, the fall or descent of the charge is effected in such a way and by such means that glass of the charge may continue in motion and is not forced or caused to move into firm heat transferring contact with any external molding, supporting or guiding surface. In the event that the charge descends into a receiver below the level of the neck ring, its fall or descent therein may be checked by the contact of an axial portion of the bottom of the charge with the tip of the aforesaid retracted pressing plunger, the walls of the receiver acting to limit the spread of the glass of the charge on the plunger and to guide the charge during an initial part of a reverse or upward movement thereof by the plunger. At the time of and after the descent of the charge has been checked, glass of the lower portion thereof may sag or move downwardly over the tip of the plunger or plunger head and downwardly and outwardly in the space between the plunger head and the surrounding wall of the receiver. Other glass of the charge may move to fill the space vacated by the downwardly moving lower glass and to fill other space in the receiver to which such glass may move by gravity. Such movement or movements of the glass may be cushioned by air within the receiver around and above the plunger head and the glass may be prevented from establishing firm, good heat transferring contact with any external wall, such as the surrounding wall of the receiver, both by reason of the continuous shifting or movement of the glass and by an intervening gaseous film between the glass and such wall. Loss of heat from the charge to the surrounding wall of the receiver sufficient to cause harmful or unequal chilling of any lateral portion or different portions of the charge will thus be obviated.

The upward movement of the plunger may commence while the charge is still falling or moving downward toward it or concurrently with or immediately after the checking of the charge. The reversal of movement of glass of the charge thus may commence practically simultaneously with the checking of its fall or descent. The glass of the lower portion of the charge may continue to move downwardly over the plunger tip for an initial part of the upward movement of the plunger but as the plunger moves upward, the support of the charge by the plunger may become more and more dominant so that part of the upstroke of the plunger may be utilized to move the charge upwardly as an entity. The body of the parison is formed first and glass is displaced downward to form the neck finish or finished rim of the parison at the conclusion of the pressing stroke. The upward movement of the plunger will cease when all the glass of the charge has been pressed in the inverted parison press mold and neck ring assembly into a hollow parison having a neck finish or finished rim portion at its lower end. The external dimensions of such a parison are determined by the dimensions of the combined cavities of the parison press mold and neck ring and any slight variations in the weights of successive charges are taken care of by slight variations in the extent of the upward strokes of the plunger, or in other words, at the interior of the parison. In practice, if a suitable feeder such as hereinbefore described is employed, this variation of weight, if any occurs, is ordinarily relatively slight and in consequence a very slight variation of the extent of successive upward strokes of the pressing plunger will ordinarily compensate for any weight variation. The upward movement of the plunger may be continuous or by steps and is of predetermined suitable speed which may be varied as required or deemed desirable.

The plunger is withdrawn after the completion of the pressing operation and so that this may be done without disturbance of the internal shape of the parison and without possible sticking of the plunger, air under pressure may be applied around the pressing plunger at the time of downward withdrawal. This air may be continued for a brief time against the interior of the parison after the withdrawal of the plunger to assure continued firm contact of all parts of the parison with the mold walls and to prevent possibility of inward sagging or deformation of any portion of such parison while it is in the press mold. In lieu of such continued application of pressure fluid or in addition thereto, suction may be applied to the exterior of the parison.

The parts of the press mold are removed, leaving the parison supported by the neck mold. The parison will then begin to reheat and this reheating step may be continued for a selected period of time while the parison remains in its inverted or neck downward position. Thereafter, the neck ring and the parison supported thereby may be given a suitable movement to invert the parison and to lower it to a transfer position between the open halves of a final blow mold which may be closed thereabout to suspend the parison within such final blow mold. The parison may be left thus suspended within the final blow mold for further reheating and downward elongation until the lower end thereof has reached the level desired, as to or close to the bottom of the final blow mold. Pressure fluid may then be applied to the interior of the parison to blow it to final form in the blow mold. The result will be an article of glassware having walls free from waves and from defects such as may be found in a generally similar article as previously produced from feeder fed charges by any prior known method.

The fall or descent of the charge may be checked while all the charge or the major portion thereof is within the confines of the body of the parison press mold, as when a press mold and a charge suitable for the production of a narrow necked article, such as a bottle, are employed, by downwardly tapering walls of the lower portion of the inverted press mold or mainly by such tapering walls and in some part by the tip of the associate pressing plunger. The pressing plunger may be completely below the level of the lower end of the charge and moving upward or may have been moved upward sufficiently to contact with the central portion of the lower end of the charge at the time of checking of the fall or descent of such charge. In either instance, glass of the charge will be continuously in motion as glass of the lower portion thereof sags or moves downwardly by gravity over the plunger tip and into available space within the surrounding walls, being prevented from moving into intimate or good heat transferring contact with such external walls both by reason of the continuous shifting and movement of glass and by the intervening gaseous film.

Upward movement of the plunger will lift the charge, as in the mode of operation previously described. As a result of the upstroke of the plunger the charge will be pressed between such plunger and the walls of the cavity of the inverted press mold and neck ring assembly to form an inverted hollow parison having a neck finish or finished rim portion at its lower end and having the hereinbefore described qualities of uniformity of skin formation and condition and a desirable distribution of glass of the charge throughout the different portions of the parison. The upward movement of the plunger may be continuous or in successive steps and may be at any speed or of any character deemed necessary or advantageous. The neck finish or finished rim portion will be formed last.

The operations after the pressing operation may be substantially as previously described, the inverted parison being permitted to reheat while in its inverted position, being removed from the parison mold and reverted during its transfer to a final blow mold, permitted to reheat and sag in the blow mold, and finally blown to final form in the blow mold.

It will be noted that operations such as those just described for forming parisons according to the present invention practically constitute continuations of the preceding charge delivering operations and that in each instance the glass of which an article is to be made is not permitted to remain static in any potentially harmful position or for any time-consuming period until the parison has actually been formed.

The operations on the glass of the charge to form it into the pressed hollow parison desired preferably are timed to start the instant the charge has reached a position at which the first of these operations can take effect thereon, and such operations are performed as rapidly as possible in a continuous succession so as to require but a relatively short overall time—much less than the time required to form a parison by the use of any prior process. In an extremely short space of time, the descent of the falling charge has been checked and the charge has been pressed into firm, uniform overall chilling contact with the molding walls. This chilling contact, to which the glass of the charge is subjected only at the time such charge is pressed to the shape desired, completely dominates and thus practically overcomes the effect of any minor chilling influence to which any external portion of the charge may have been subjected up to the time of the pressing operation. Consequently, the pressed parison will be provided with an outer skin or externally chilled surface portion of substantially uniform thickness, toughness and thermal condition throughout the entire area of its body and thus is better adapted than the parisons produced by prior methods for the subsequent operations by which such parison may be formed into the particular article of hollow glassware that is being made.

The parisons produced in accordance with the present invention are adapted to be blown by pressure fluid into articles of glassware of superior quality, each such article having walls free from waves and of substantially uniform thickness. The amount of glass in a charge for a given article may thus be selected to predetermine the thickness of the walls of the final article. The invention therefore has important utility in the production of glassware of even moderately light weight and is of even greater importance and benefit in the production of glassware of lighter weight.

By using suitable pressing plungers and press molds of suitable sizes and shapes, pressed articles of the final shapes desired, such as tumblers, may be produced by parison-forming operations of the present invention, subsequent operations as described for the production of blown articles then being omitted.

The accompanying drawings illustrate apparatus embodying structural features of the invention and various stages of specifically different modes of operation by which the invention may be carried into effect. Reference may now be had to these drawings, in which.

Figure 1:
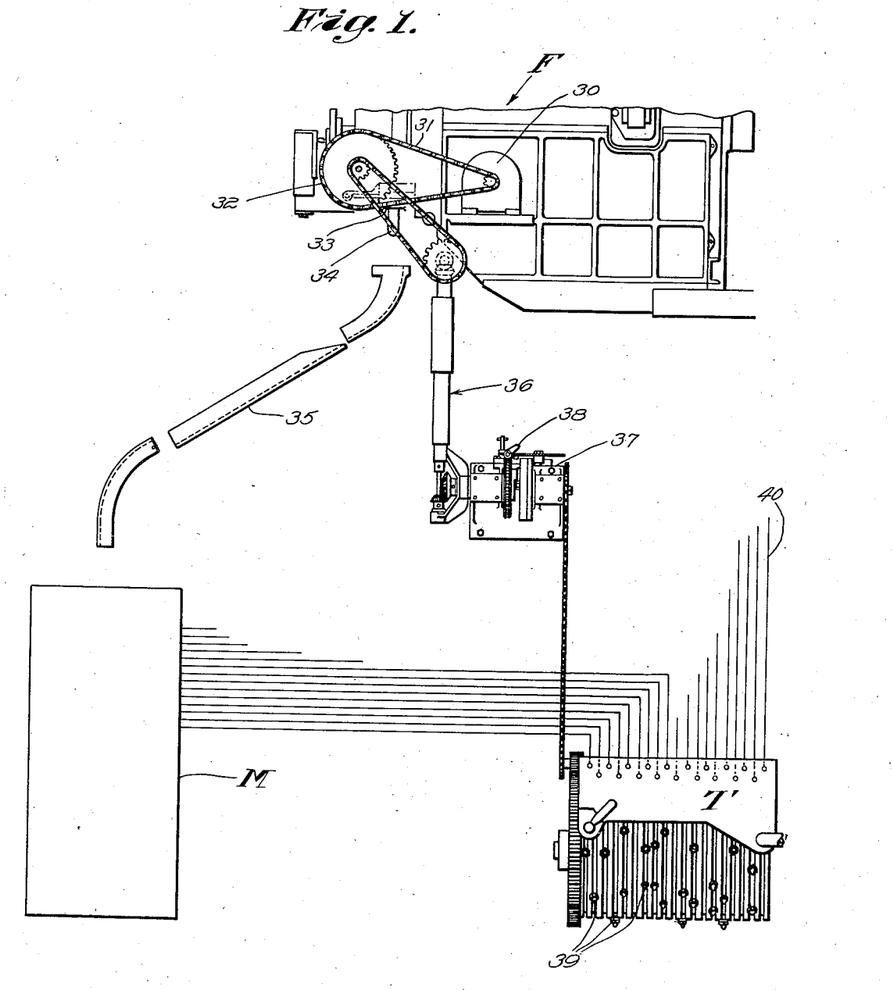
Fig. 1 is a view, showing an assembly of a feeder, an associate forming machine and a timer operatively connected with the feeder and the forming machine for producing adjustably timed, synchronized operations of both in accordance with the present invention, the forming machine and its connections with the timer being shown only diagrammatically.

In Fig. 1, a feeder F is provided with a motor 30 having a driving connection 31 with an operating mechanism, indicated at 32, from which the working parts of the feeder are operated so as to produce a regular succession of mold charges of predetermined desirable shape, size and thermal condition. The feeder includes severing mechanism, indicated at 33, operated so as to sever each such mold charge, one of which is indicated at 34, from the glass supply at the proper time. The instant of delivery of the charge is thus accurately predeterminable. The severed charge may be delivered to the associate forming machine, which is indicated diagrammatically at M, by a suitable charge delivering trough mechanism 35.

The feeder operating mechanism 32 is shown as being connected by driving mechanism, generally indicated at 36, with a timer T. This connecting mechanism 36 includes adjusting means, indicated at 37, controllable by a handle 38, whereby the feeder operations and the operations of the forming machine that is controlled by the timer T may be brought into synchronism or phase adjustment between them effected as conditions require or make desirable at any given time. The adjusting means 37 and its operating handle 38 are shown only diagrammatically. The details thereof may be of any suitable known construction, such, for example, as are included in the Hartford I. S. forming machine of the form shown in the hereinafter more particularly identified and described Ingle Patent 1,911,119. The timer T, as aforesaid, controls the operations of the working parts and instrumentalities employed in the formation of each charge of glass into an article of hollow glassware. These several working parts and operations may be individually controlled and adjusted as to time and character by suitable adjustable buttons or adjusting elements on the timer drum, some of which are indicated at 39. The particular timer includes a valve box having numerous valves therein, controlling suitable pressure fluid lines, such as those indicated at 40, leading to the parts of the forming machine which are to be operated in the formation of the successive charges of glass into the articles of glassware being made.

As described so far, the general assembly shown in Fig. 1 may be substantially as disclosed in Patent No. 1,911,119, granted May 23, 1933 to Henry W. Ingle, assignor to The Hartford-Empire Company for Glassware forming machine. This patent shows the assembly of a Hartford I. S. machine, Hartford single feeder, and the controlling timer and its connections with the feeder and the forming machine, together with details of the construction and operation of such assembly.

It is to be understood that any other suitable organization of forming machine, feeder, timer, adjustments, and connections may be employed as the structural and functional basis for the special provisions and operations contemplated by the present invention.

Figure 2:
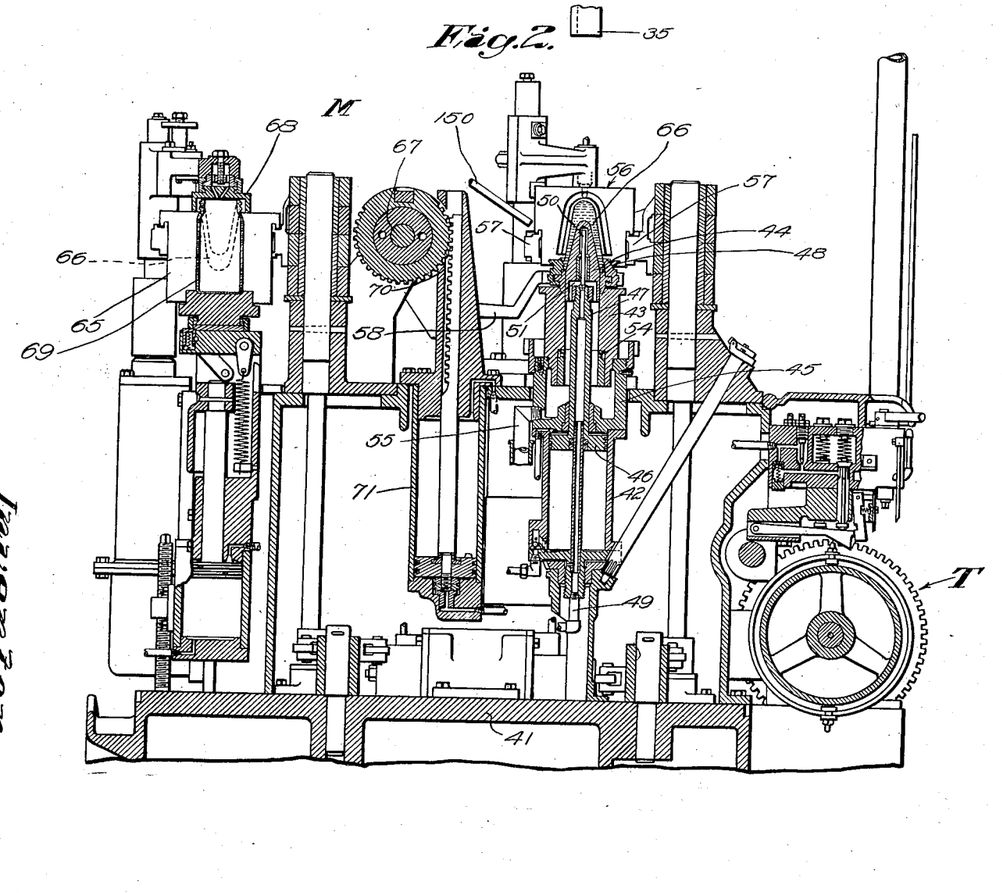
Fig. 2 is a fragmentary view, mainly in vertical section, showing the principal supporting and operating parts of a Hartford I. S. forming machine section together with special parts by which a machine of that type may be adapted for use in forming articles of hollow glassware according to the present invention.

In Fig. 2, the forming machine M, representing one section of the Hartford I. S. forming machine, includes a base 41 on which a vertically disposed fluid pressure cylinder 42 is mounted. This cylinder supports a vertically disposed charge receiver 43. A separately formed and individually movable neck ring 44 is disposed at the upper end of the vertical receiver 43. The glass forming cavity of the neck ring is larger than the interior of the receiver so that the charge, when lifted through the neck ring by the plunger, will not catch on the edges or grooves of such neck ring. As shown, the charge receiver is mounted on a hollow upward extension 45 on the upper head of the pressure cylinder 42.

A piston 46 is reciprocable in the cylinder 42 and carries an upstanding rod 47 which, at its upper end, carries a pressing plunger 48. The base of this pressing plunger may be of suitable size and shape to fit slidably in the charge receiver 43. The plunger may be upwardly tapering from this base portion to its tip. Of course, the shape of the tapering or upper portion of the plunger will be selected according to the particular pressing operation to be effected.

The plunger may be hollow so that it may be cooled internally. As shown, Fig. 2, a water supply pipe 49 is connected by a series of internal passages leading through the cylinder 42, the piston 46 and the rod 47 to a nozzle 50 in the hollow plunger head. Cooling fluid may be discharged from this nozzle into the plunger head and thence through passages 51 in the base of the plunger to the interior of the receiver 43. This cooling fluid may be broken up by air from a source hereinafter described and commingled with oil or lubricant within the receiver. If a liquid, such as water is used, it may be vaporized during its passage through the plunger head. A thin heat insulating and lubricating lining or film may thus be provided on the inner walls of the receiver 43. The application of water from the supply pipe 49 may be intermittent, under control from the timer T, and may be under relatively low pressure.

Figure 3:
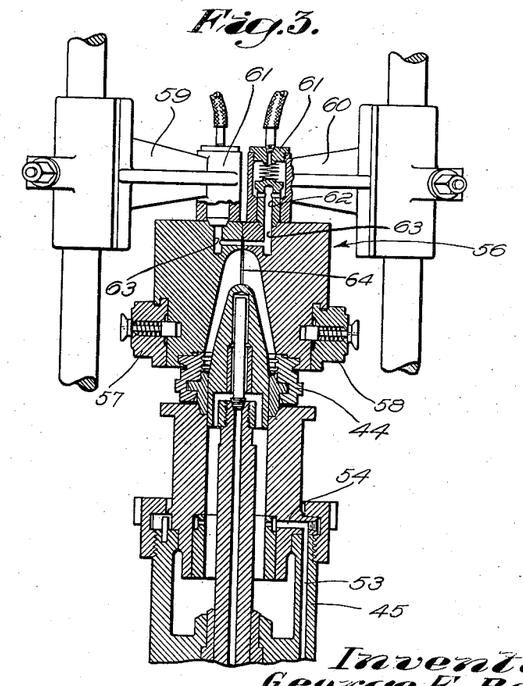
Fig. 3 is a relatively enlarged fragmentary vertical sectional view of a blank press mold, an associate neck ring, pressing plunger and receiver for forming pressed glass parisons, together with one form of combination suction and hold-down means for the press mold, all as included in the structure shown in Fig. 2.
Figure 4:
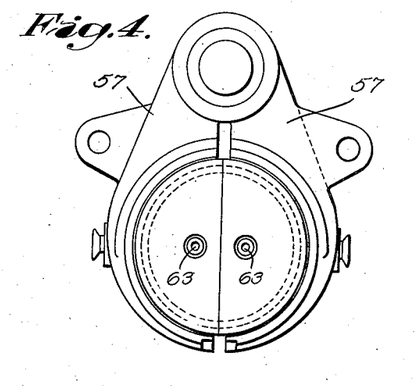
Fig. 4 is a plan view of the press mold of Fig. 3 showing the sectional character thereof.

In addition to the application of a cooling fluid, such as water, to the interior of the plunger head, air under pressure may be applied intermittently to the interior of the receiver and thence around the head of the plunger and upwardly between the plunger and the surrounding walls of the receiver. Such air may pass from a suitable supply line, such as that indicated at 52, Fig. 13, for example, through a passage in the walls of the receiver support 45, as indicated at 53, Figs. 3 and 13 and inwardly extending radial ports 54, Figs. 3 and 13 through the walls of the receiver to the interior thereof. This pressure fluid likewise may be under the control of the timer T and intermittently applied in timed relation with the application of the cooling fluid for a purpose to be hereinafter pointed out. The final exhaust of liquid and fluid from the receiver may be effected through the pipe 55, Fig. 2.

A downwardly facing or inverted parison press mold 56 may comprise a pair of cooperative half sections carried by suitable movable holders 57. These, in the application of the invention to the I. S. type of forming machine, may be the usual holders for the sections of the usual parison mold body of that machine. The operation of these sections of the parison press mold may be under control of the timer T so that the sections may be swung apart to permit a charge of glass to descend between them through the neck ring into the receiver and closed as quickly as the descent of the charge will permit. The neck ring 44 likewise may comprise sections carried by the usual neck ring supporting arms of the I. S. forming machine structure, one of these arms being indicated at 58 in Fig. 2. A suitable lubricant or "dope" may be discharged into the neck ring from the nozzle 150, Fig. 2, before the receipt of each charge and the closing of the parison press mold sections.

Vertically reciprocable and laterally swingable arms 59 and 60, respectively (see Fig. 3), ordinarily are employed in the Hartford I. S. forming machine to carry and operate a parison mold bottom plate and a charge guiding funnel, respectively. In the application of the present invention to the main structural parts of the I. S. forming machine, these arms may be utilized to carry combination press mold hold-down and suction heads 61. Each is brought at the proper time, under control of the timer T, to a position to bear on the upper surface of a section of the inverted blank press mold 56 and to connect a suction passage 62 at the interior thereof with a suction passage 63 in the underlying press mold section. The suction passages 63 lead to a suction groove, indicated at 64, between the sections of the closed press mold. Application of suction through these passages, under the control of the timer T, may be utilized or dispensed with as desired.

The neck ring may be swung from the position shown in the right-hand portion of Fig. 2, in which the neck ring forms part of the parison forming structure, to position to revert a formed parison and transfer it to a blow mold, such as that indicated at 65 and shown in the left-hand portion of Fig. 2. This blow mold may comprise sections supported and operated by the usual blow mold supporting and operating arms of the Hartford I. S. machine, under control of the timer T. Thus, starting with an inverted pressed parison 66 supported by its neck finish portion in the neck ring 44 as shown in the right-hand portion of Fig. 2, the parison press mold 56 may be opened and the neck ring and the parison supported thereby swung about the axis of the horizontal supporting shaft 67 to the position indicated by the dotted lines in the left-hand portion of Fig. 2. At this position, the halves of the blow mold will be closed about the body of the parison so as to support it when opening of the neck ring releases such parison. The neck ring then is returned to its former position, the sections thereof being closed.

A blow head 68, which may be supported and operated by a usual part of the Hartford I. S. forming machine under the control of the timer T, may be brought to operative position on the blow mold and the parison thereafter blown to form the final article, such as a jar 69, at a suitable time in the cycle of operations of the forming machine. The swinging parison transferring and return movements of the neck ring about the axis of the shaft 67 may be effected by the usual operating mechanism of the I. S. machine, including the rack and pinion arrangement indicated at 70 and the air motor 71.

It will be noted that the parison that has been delivered to the blow mold 65 may be undergoing fabrication to form the final article desired while the next charge that has been supplied by the feeder is being formed into a hollow parison by the parison-forming mechanism and/or is being reheated at the parison forming station. Thus, the cycle of manufacture of the final article overlaps the cycle of manufacture of the succeeding parison.

A description will now be given, particularly with reference to Figs. 5 to 12, inclusive, of various stages in the operations of forming a charge of glass into an article of hollow glassware in accordance with one mode of using the invention.

Figure 5:
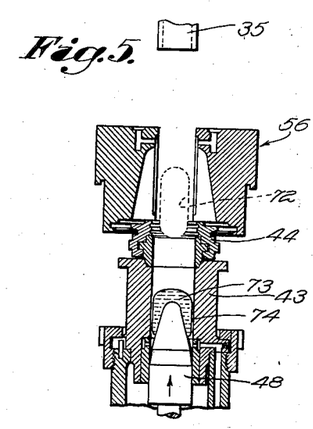
Figs. 5 to 10, inclusive, are fragmentary vertical sectional views of the sectional parison press mold, the neck ring, the pressing plunger and the receiver of the structure of Fig. 2 at different stages in the formation of a charge of molten glass into an inverted hollow glass parison.

In Fig. 5, the halves of the parison press mold 56 are closing at the time of the descent between them of a charge 72 of molten glass. This charge has been produced by the cooperating feeder and directed axially downwardly between the halves of the mold 56 by the delivery mechanism 35. It will be understood that if a trough or chute type delivery mechanism is employed, a suitable fluid film may be provided on the charge conducting surface thereof and other known provisions taken to avoid distortion or impairment of the charge during its delivery to the parison forming mechanism and to insure accurate timing of delivery of successive charges. If conditions permit, the successive charges may drop vertically downward through the atmosphere or a guiding funnel from the feeder outlet to the parison forming mechanism.

The charge 72 descends through the neck ring 44 into the receiver 43 onto the tip of the plunger 48. The plunger 48 may be moving upwardly at this time. The falling charge will telescope over the tip of the plunger so as to be supported thereon, as for example, in the form indicated at 73. Air within the receiver may provide a yielding elastic cushion around the plunger tip beneath the glass and a film, indicated at 74, between the outer surface of the glass on the plunger and the walls of the receiver. This film may include oil or water vapor in the air. The film, whether it comprises air, a mixture of air, water and oil vapor or any other gaseous composition will serve, so long as it persists, to prevent good heat transferring contact of the glass with the cooler walls of the receiver. This desirable condition is aided by the support of the glass at its axial portion on the plunger so that all portions of the glass charge are free to shift in relation to the walls of the receiver. Such shifting movement aids in prolonging the effective life of the intervening gaseous heat insulating film between the glass and the adjacent wall of the receiver and in preventing establishment of a good heat exchanging relation between any portion of the glass and a wall of the receiver. Thus, the receiver serves as an internally-heat-insulated surrounding wall for guiding the charge and to limit the extent of lateral spreading movement of the glass thereof rather than as a heat extracting or glass chilling contact wall.

Figure 6:
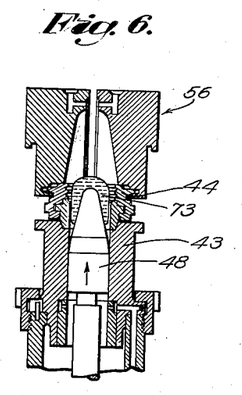

As has hereinbefore been stressed, the operations involved in forming a parison according to the present invention are initiated and effected very rapidly. The upwardly moving plunger almost instantly assumes support of the glass 73 and moves it bodily upward through the neck ring into the cavity of the closing parison press mold. A stage of proceedings following quickly after that illustrated in Fig. 5 is shown in Fig. 6. The parison press mold is almost completely closed and the supported glass on the plunger 48 has been moved upward until such glass protrudes above the neck ring into the cavity of the press mold. This upward movement has been effected without subjecting the glass to any forced contact or good heat transferring contact with the surrounding walls which, as aforesaid, serve more as guiding surfaces coated with a heat insulating gaseous film than as a glass chilling or heat extracting structure. The glass may have sagged downward slightly on the tapering plunger head.

Figure 7:
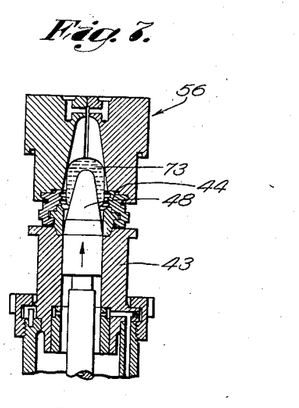

Fig. 7 illustrates an instant after the Fig. 6 stage of operations. The glass charge on the plunger has been raised almost completely into the cavity of the parison press mold which is now completely closed. Heat insulation of the glass from the walls of the parison press mold may be effected by the space between the smaller diameter charge and such walls until the charge has been lifted to a narrower part of the mold cavity. Thereafter the presence of a gaseous film, such as hereinbefore described, will prevent substantial loss of heat from the glass to the mold walls until the glass has been pressed against such walls.

Figure 8:
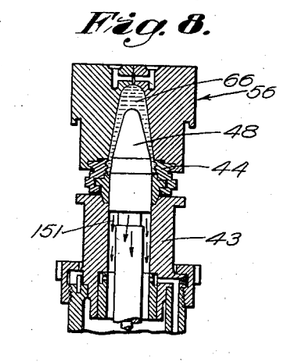

As shown in Fig. 8, the upward movement of the plunger 48 has caused pressing of the glass of the charge against the walls of the cavity of the parison press mold 56 and into the available space within the neck ring 44 so as to produce a hollow parison of the shape desired. The outer wall of this parison will be chilled uniformly to substantially the same extent and for substantially the same period of time at all places on its periphery. In other words, substantially all parts of the walls of the parison are formed by the pressing of glass of the charge against the walls of the combined cavities of the inverted parison press mold and neck ring at substantially the same time, the formation of the neck finish or finished rim completing the operation.

During the contact of the plunger with the glass, cooling liquid may have been applied to the interior of the plunger head in the way which hereinbefore has been pointed out. Exhaust of vapors and any residual liquid downward beneath the plunger head into the receiver is indicated at 151 in Fig. 8.

After a suitable period of pressing, the plunger is withdrawn from the glass parison. Before withdrawing the plunger, air may be supplied to pass around the plunger. This air pressure will prevent suction at the interior of the parison as the plunger is withdrawn and will aid in maintaining pressing contact of the outer walls of the parison against the walls of the parison press mold after the plunger has been withdrawn, as indicated at 75, Fig. 9. The parison thus receives an external chilling which completely eliminates the effects of any minor differential chilling contacts which different portions of the charge may have had in transit to the parison press mold or prior to the pressing operation. The skin or enamel at the outer surface portion of the parison thus will be substantially uniform in toughness and thermal condition.

Figures 9, 10:
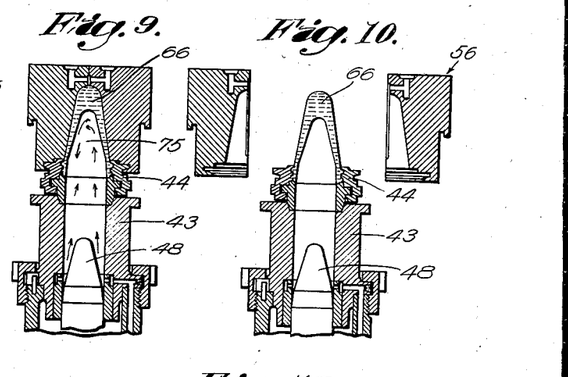

The parison will of course start to reheat internally as soon as the plunger has been withdrawn. I may effect reheating of the parison externally as well while it is in inverted position, as when supported by its neck finish in the neck ring 44 out of contact with the sections of the parison body mold as shown in Fig. 10.

Figure 11:
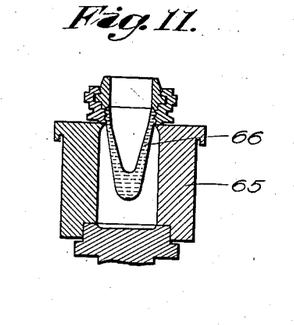
Fig. 11 is a fragmentary vertical sectional view showing the neck ring of the parison forming mechanism of Figs. 5 to 10, inclusive, in position to transfer the reverted hollow glass parison to a blow mold.
Figure 12:
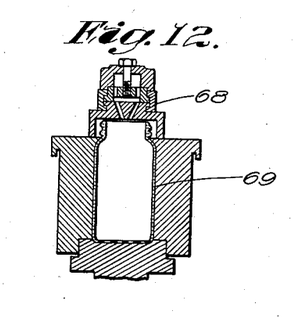
Fig. 12 is a fragmentary vertical sectional view, showing the fully blown wide-mouthed article, in this instance, a jar, in the blow mold.

After reheating of the parison 66 internally and externally for a suitable period, the neck ring is operated to revert the parison and transfer it to the associate blow mold. As shown in Fig. 11, the neck ring is still supporting the parison by its neck finish portion above the blow mold which has been closed about the body of the parison. The neck ring may now be opened to release the parison and thereafter closed and returned to the top of the receiver 43. After the parison has reheated in the blow mold and has elongated by gravity, it may be blown to final form in the blow mold, as by blowing pressure applied through the blow head 68. The result will be an article of glassware, such as a jar 69, which will have practically wave free walls.

In the operation just described, the means for applying suction to the interior of the closed parison pressed mold ahead of the glass that is being moved upwardly thereinto may be utilized or maintained inactive, as preferred or as conditions may seem to require. Any other suitable form of mechanism for maintaining the sections of the parison press mold closed may be employed in lieu of the particular mechanism shown in Figs. 2 and 3 and hereinbefore described in detail.

Figure 13:
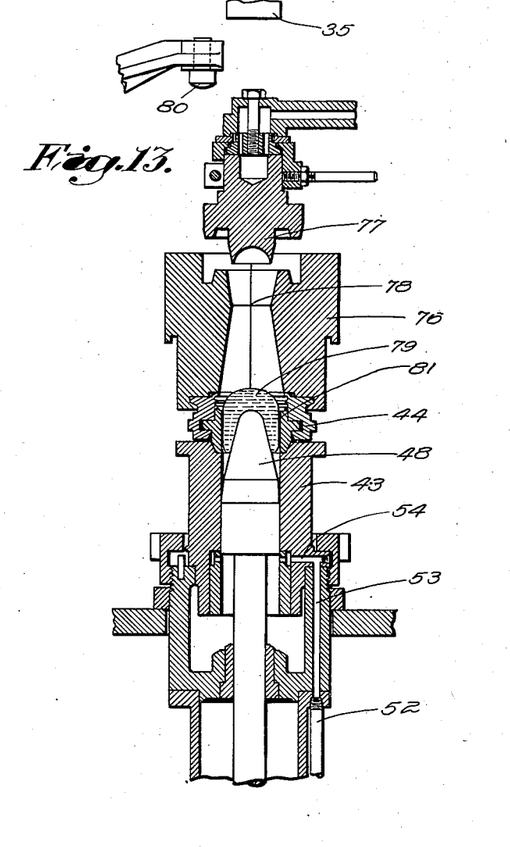
Fig. 13 is a relatively enlarged fragmentary vertical sectional view of a blank press mold, a neck ring, a bottom plate for the press mold and an associate pressing plunger and glass receiver as these parts appear at one stage in the operations of forming a charge into a hollow parison according to a method in which the downward fall of the delivered charge is checked in the upper part of the receiver.

In Fig. 13, I show the first stage, after the receipt of a downwardly moving charge, in the formation of a hollow parison by the use of a parison press mold and specific operations slightly different from those which have been described. The parison press mold shown in this view comprises a body 76 which may consist of a pair of separable halves or sections supported for operating movements in the same manner as the sections of the press mold 56. The inverted press mold body 76 is, however, open at its upper end until a bottom plate 77 has been placed in an operative position thereon. The open upper internal portion of the parison press mold body 76 may enlarge upwardly from its juncture with the bottom of the mold cavity proper, as at 78, to serve as a guide for directing a falling charge of glass axially downward between the closed sections of the body 76 onto the head of the plunger 48. The charge may be delivered from the chute or trough mechanism 35. The plunger may be disposed sufficiently far up or may have been moved upward sufficiently far to engage with and support the glass charge 79 practically within the confines of the extreme upper portion of the receiver and the neck ring or even at a higher level. The bottom plate 77 may be carried by the usual vertically reciprocating and laterally oscillating bottom plate operating mechanism of the Hartford I. S. machine, timed and operated to close the upper end of the cavity of the inverted parison press mold 76 as soon as possible after the descent of the glass charge into such cavity. A somewhat different hold-down means for maintaining the bottom plate and the sections of the parison body mold closed is indicated at 80.

The operations which include the stage shown in Fig. 13 will be readily understood. The glass charge on the plunger 48 will be spaced from the surrounding walls by a gaseous film, indicated at 81. The upward movement of the plunger will effect pressing of the glass in the parison press mold to form the parison desired. This parison may be appropriate for subsequent fabrication into a jar or other wide-mouthed or semi-widemouthed article or, if an appropriately shaped parison mold is used, into a narrow necked article. The operations subsequent to the pressing of the glass to form the parison desired may be such as hereinbefore have been pointed out.

Figures 14, 15, 17:
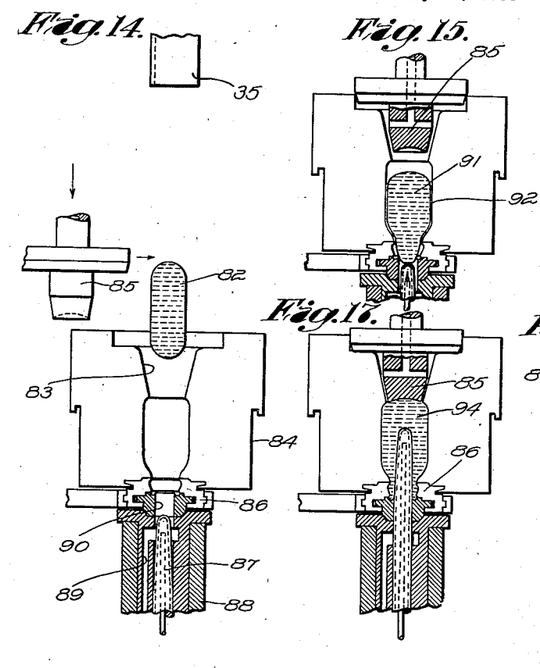
Figs. 14 to 17, inclusive, are fragmentary vertical sectional views of an inverted blank press mold, a bottom plate therefor, a neck ring, and a pressing plunger and its mounting as these parts appear at different stages in the method of forming a charge of molten glass into a hollow parison suitable for subsequent expansion into a narrow-necked article, such as a bottle.

Figs. 14 to 19, inclusive, show various stages in the operation of forming a narrow-neck article, such as a bottle, according to the present invention. In Fig. 14, a charge of molten glass 82 is shown descending from the delivery mechanism 35 vertically into the charge directing entrance 83 to the cavity in the inverted parison press mold body 84. This press mold body may comprise sections supported and operated as hereinbefore explained. A bottom plate 85 is supported and operated so as to follow the charge 82 as closely as possible and to complete the formation of the parison press mold as soon as the downward passage of the glass will permit. The parison forming structure includes a neck ring 86 which may be supported and operated substantially as hereinbefore has been described. A vertically movable pressing plunger 87 is supported by a suitable mounting, indicated at 88, for cooperation with the parison press mold structure.

The plunger may be cooled internally by the circulation therein of a liquid cooling medium. Air under pressure may be applied through passages, such as indicated at 89, to the space below and in the inverted parison mold body and neck ring. The supply of air through the passage 89 may be controlled by the timer T.

In the use of the construction shown in Fig. 14, the downward movement of the charge may be checked while the greater portion thereof is within the cavity of the inverted body mold 84. The lower portion of the charge may then depend within or through the neck ring, the receiver of the previously described structures existing in the present form only as a space beneath the neck ring, such as indicated at 90, in which the plunger may be reciprocated. The plunger may be moving upward at the time of the descent of the charge and such descent may be checked by the downwardly tapering lower walls of the cavity of the parison mold or by these walls and the plunger conjointly.

Figure 16:
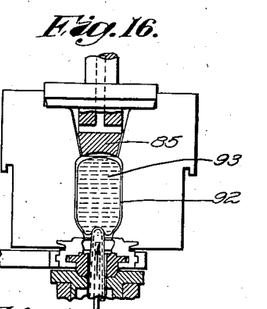

As shown in Fig. 15, the glass charge, indicated at 91, is spaced from the walls of the mold 84 by a thin heat insulating gaseous film 92. The bottom plate 85 is moving to its closed position and will reach such position before the upward movement of the plunger has lifted the glass against the walls at the top of the cavity of the inverted mold. Thus, as shown in Fig. 16, the bottom plate 85 is fully seated before the upward movement of the glass charge, now indicated at 93, has ended.

It has been assumed for the purpose of illustration (Fig. 15) that the lower end of the charge has descended below the level of the upper end of the neck ring at the time it is contacted by the plunger and its upward movement by the plunger is commenced. The level to which the lower end of the charge descends and at which its movement is reversed by the plunger may be higher and may be above the upper end of the neck ring, as, for example, at the level indicated for the lower end of the glass charge in Fig. 16. The disposition of the charge and the action thereon by the plunger are such that no portion of the charge will catch on an edge of a groove of the neck ring and preferably no glass enters the neck finish forming cavity of the neck ring until downward displacement of glass at the conclusion of the pressing stroke of the plunger fills such cavity and forms the neck finish portion of the parison.

In Fig. 17, the plunger has reached the upper end of its stroke and has pressed the glass to form the parison 94 which has a neck finish portion 95 in the neck ring 86.

Figure 18:
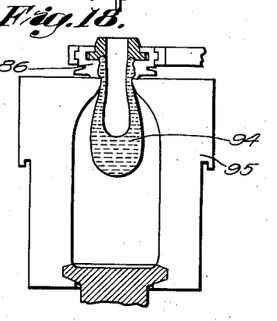
Fig. 18 is a fragmentary vertical sectional view showing the neck ring of the mechanism of Figs. 14 to 17, inclusive, in position to transfer a reverted hollow parison for a narrow necked article to its blow mold.
Figure 19:
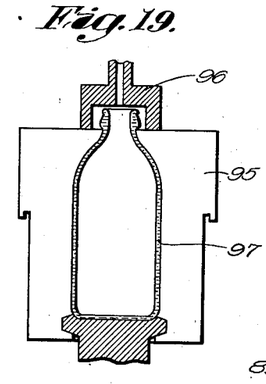
Fig. 19 is a fragmentary vertical sectional view showing the narrow necked article, i. e., a bottle, as blown to final form in the blow mold.

After a reheating period such as has been described, the parison may be reverted and transferred by the neck ring to a blow mold 95, Fig. 18. Thereafter, the neck ring may be returned to its former position for cooperation with the other parison forming mold parts. After the parison has reheated and elongated by gravity within the blow mold 95 for a suitable period, blowing pressure may be applied thereto, as from a blow head 96 to blow the parison to the shape of the cavity of the blow mold and thus form the desired article of glassware. This has been shown as a bottle 97.

Figure 20:
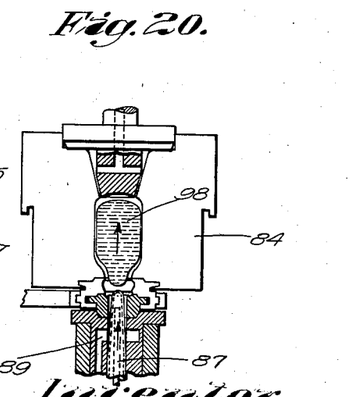
Fig. 20 is a fragmentary vertical sectional view showing one stage in the operation of forming an inverted hollow parison for a narrow necked article of glassware by the use of parison-forming mechanism as in Figs. 14 to 17, inclusive, but with the further use of a pressure fluid applied beneath the charge of glass.

If desired, air under pressure may be applied through the passage 89 beneath the glass in the parison press mold to aid the plunger in lifting the glass upward for the pressing operation or even to impel the glass upwardly ahead of the plunger. As shown in Fig. 20, the glass charge 98 has been impelled upward on an air film between itself and the walls of the parison press mold by underneath air pressure. The plunger 87 is however moving upwardly rapidly so as to press the glass to form the parison practically as soon as it has reached the upper part of the mold cavity.

In Figs. 21 to 25, inclusive, I show another arrangement of structural parts and specifically different steps for carrying out the invention. A charge delivery trough or funnel is indicated at 99 above the upper end of a charge receiver 100. This trough or funnel may correspond functionally with the delivery arrangement 35 of the preceding structure. The upper end portion of the receiver may be formed as an integral neck ring 101. The neck ring may however be formed separately from the body of the receiver. The receiver and the neck ring or the two combined may consist of sections supported and operated by operating parts of a forming machine, as will be understood from the description that already has been given. The charge receiver and its holder may be supported on a spindle 102, which may constitute a bearing for the stem 103 of a pressing plunger having a head 104 fitting slidably in the receiver 100. This plunger head may have an upwardly tapering form and is adapted to penetrate axially and support a charge of glass within the receiver, as at 105. The arrangement is such as to provide a gaseous heat insulating film 106 between the glass 105 and the walls of the receiver, as in the previously described operations.

Figures 21, 22, 23:
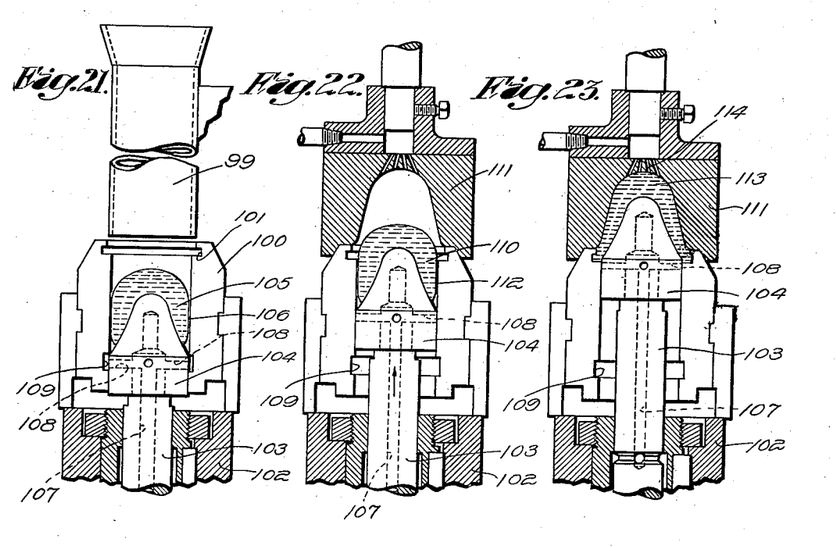
Figs. 21 to 23, inclusive, are vertical sectional views showing an arrangement of a parison press mold, neck ring, pressing plunger and glass receiver beneath the neck ring as these parts appear at different stages in the operation of forming a wide-mouthed inverted parison suitable for subsequent fabrication into a paste mold article, according to one method of the present invention.

The plunger head may be provided with a central bore 107 communicating with radial ports 108 and an annular groove 109 in the walls of the charge receiver so that air under pressure may be applied beneath the glass in the charge receiver.

As shown in Fig. 22, the plunger has moved upwardly in supporting relation with the glass to raise the charge, now indicated at 110, into the cavity of a superimposed inverted parison press mold 111. This mold has been brought to its position on the top of the neck ring by the use of any suitable supporting and operating mechanism, such, for example, as that shown in Patent No. 1,911,119 for operating the parison mold blowhead 85 of the Hartford I. S. machine of the disclosure of that patent. A thin gaseous film persists between the glass and the surrounding wall of the receiver and is indicated at 112. As shown in Fig. 23, the upward movement of the plunger has pressed the glass to form the hollow parison indicated at 113.

The parison press mold 111 may be provided with suction passages, such as indicated at 114 for use if deemed desirable or necessary to eliminate air from the upper part of the mold cavity in advance of the glass or to aid in maintaining the glass in contact with the walls of the mold cavity. Air through the passages 107, 108 and 109 may be utilized at the time the plunger is withdrawn to prevent suction on the glass and may be applied to the interior of the glass parison 113 after the withdrawal of the plunger to produce continued firm chilling contact of the outer walls of the parison with the heat extracting walls of the press mold, substantially as has been pointed out in connection with previous operations.

Figures 24, 25:
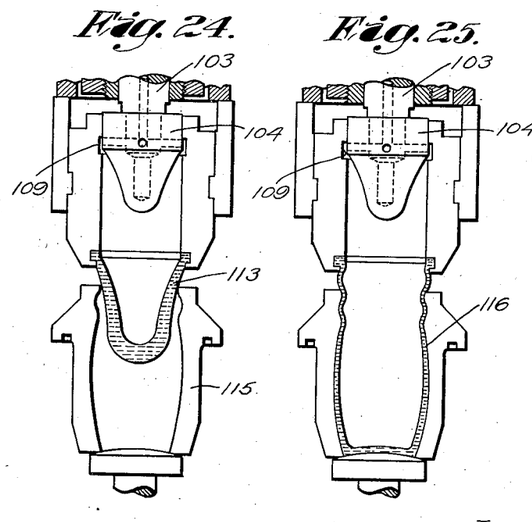
Fig. 24 is a fragmentary vertical sectional view showing the hollow parison supported in reverted position by the neck ring, receiver and plunger assembly, so as to depend into an associate paste mold.
Fig. 25 is a view showing structural parts as in Fig. 24 after the blowing of the hollow parison to form the final article in the paste mold.

After the operation shown in Fig. 23 and after a suitable period of reheating, the neck ring or the receiver and the neck ring unit, if they are made in one piece, is operated to revert the parison and to lower it to position to depend within a cooperative final blow mold unit 115. This may be a paste mold unit and the receiver and the neck ring may be rotated while they support the pendent parison within the mold unit 115 for development and expansion of such parison by blowing pressure, puff blowing, or gravity or by any combination of these agencies.

As shown in Fig. 25, the parison has been expanded to form the final article, which is indicated at 116. After the operations described, the receiver and neck ring unit is disengaged from the neck finish or finished rim portion of the article and the latter may be removed from the final blow mold in any suitable known way. If desired, the rim or neck portion of the article may be cracked off to leave a tumbler, the edge of which may be finished or polished in a suitable known manner or the final article produced in the paste mold may include the rim or neck portion thereof.

Figure 26:
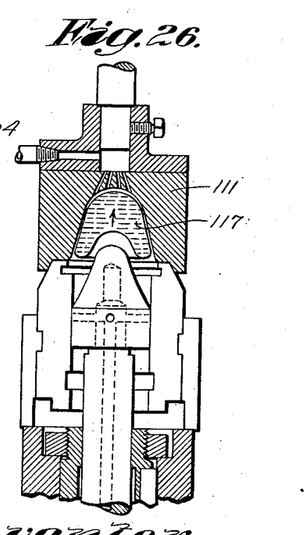
Fig. 26 is a fragmentary vertical sectional view showing parison forming parts generally corresponding to those of Figs. 21 to 23, inclusive, but showing the position of these parts as used in a method in which a pressure fluid is employed to aid or effect the lifting of the glass charge into the parison press mold.

In Fig. 26, the use of air to lift the glass in the press mold 111 is illustrated. This air may be obtained from the passages 107, 108, 109, as hereinbefore has been pointed out and may be utilized to aid the plunger in lifting the glass or to lift the glass slightly in advance of the plunger. In any event the plunger is raised quickly after the upwardly moving glass to press such glass into the parison desired practically as soon as the glass has been moved into contact with the walls of the cavity of the inverted press mold. The glass is indicated at 117 in Fig. 26 as being impelled upwardly, slightly in advance of the plunger.

The operations making use of air to impel the glass upwardly instead of lifting the glass by the plunger or to aid the plunger in lifting the glass will be otherwise the same as have been described in connection with Figs. 21 to 25, inclusive.

The structural features and steps just described as being illustrated in part in Figs. 21 to 26, inclusive, have also been disclosed in my prior application, Serial No. 191,981, filed February 23, 1938, for Method of and apparatus for forming hollow glass articles, of which the present application is a continuation in part.

It will be noted that in each of the procedures herein described, the glass of the charge has been continuously in motion through and after the period of its delivery by the attendant feeder until such charge is actually pressed into a parison of the shape desired. During all this time harmful differential chilling of different external portions of the glass of the charge has been avoided.

What I claim is:

1. The method of forming a glass parison or pressed article comprising delivering a charge of molten glass downwardly from a feeder as a moving entity, checking the downward movement of the charge at a predetermined level so that all external portions of the glass of the charge may shift relatively to all external glass chilling surfaces to prevent establishment of good heat transferring contact therewith, moving a pressing plunger upwardly into the charge before the glass thereof has come completely to rest, and quickly pressing the charge into a parison or pressed article by causing the upwardly moving plunger to force the glass of the charge into initial good heat extracting contact with all portions of the walls of the cavity of an inverted press mold at substantially the same time.

2. The method of forming a glass parison having an outer skin of substantially uniform heat condition, which comprises delivering a charge of molten glass of suitable size and condition downwardly from a feeder as a moving entity, checking the downward movement of the charge at a predetermined level in a parison forming mechanism, providing a heat insulating gaseous film between the external surface of the charge and all adjacent cooler surfaces of the parison forming mechanism, moving a pressing plunger upwardly axially into and with the charge before said gaseous film has been dissipated quickly to press the glass of the charge into molding contact with the walls of the cavity of an inverted parison body and neck mold of the parison forming mechanism before the glass of the charge has had any previous substantial heat transferring contact at its outer surface with any external glass chilling surface.

3. The method of making a glass parison which comprises delivering a charge of molten glass downwardly onto the tip of a vertically movable pressing plunger, reversing the direction of movement of the charge substantially simultaneously with contact of glass thereof with the plunger tip and before all portions of the charge have come to rest by moving the plunger upwardly into, and in supporting relation with, the glass of the charge, and quickly pressing the glass of the charge against the walls of the cavity of an inverted press mold by upward movement of the plunger to produce the parison desired.

4. The method of making hollow glassware comprising the steps of delivering a charge of molten glass suitable for an article to be made downwardly onto the tip of an upwardly movable pressing plunger, reversing the direction of movement of glass of the charge substantially simultaneously with the contact of such glass with the plunger tip and before all portions of the charge have come to rest in contact with any external glass chilling surface, pressing the glass into a parison in an inverted parison body mold and associate neck mold by upward movement of the plunger, causing a substantially uniform overall external chilling of the walls of said parison by maintaining these walls firmly against the walls of the inverted parison body mold and neck mold for a selected period of time of substantial duration, removing the pressing plunger to permit reheating of the inner walls of the inverted parison during at least part of such period of external chilling, permitting reheating of the external walls of the parison while it is in inverted position, reverting the parison and transferring it to an upright blow mold, permitting the parison to reheat and elongate in the blow mold, and blowing the parison in the blow mold to the shape of the final article desired.

5. The method of making hollow glassware having a neck finish, which comprises delivering a suitable charge of glass downwardly onto the tip of an upwardly movable pressing plunger located in a receiver below and in line with an inverted parison body mold and neck mold assembly, reversing the direction of movement of the charge substantially simultaneously with its contact with said plunger, preventing substantial heat transferring contact of any external portion of the glass of the charge with any wall of the receiver while the charge is within said receiver, quickly moving the charge upwardly above the receiver into the inverted body mold and neck mold assembly and pressing the glass of the charge in the cavity of said assembly by upward movement of the plunger, thus producing a hollow parison having its walls brought into good heat transferring contact with an external glass chilling surface initially on the pressing of said walls to an external configuration corresponding to that of the cavity of said assembly, permitting said parison to reheat while in its inverted position, reverting the parison and transferring it to a blow mold, permitting the parison in the blow mold to reheat and elongate by gravity for a selected period, and then blowing the parison to final form in the blow mold.

6. The method of forming a parison having a neck finish portion which comprises delivering a charge of molten glass as an entity moving downwardly into a molding unit comprising an inverted parison body mold, an inverted neck ring for the body mold and a charge receiver underlying the inverted neck ring, checking the downward movement of the charge as an entity so that the lower portion thereof extends through the inverted neck ring into the underlying receiver and the remainder of the charge is located in the cavity of the inverted parison body mold above the neck ring in shifting relation at its exterior with the walls of said body mold and neck ring, substantially simultaneously with the checking of the downward movement of the charge and before all the glass thereof has come to rest, reversing the direction of movement of such charge and pressing the glass thereof in said inverted parison body mold and neck ring by an upward thrust of a pressing plunger to form said parison.

7. The method of forming a parison which comprises the steps of delivering a charge of molten glass as an entity moving downwardly from a feeder, checking the downward movement of the glass at a predetermined level, moving the charge upwardly by pneumatic pressure against its lower surface to dispose the charge in an inverted parison press mold, and thrusting a pressing plunger upwardly into the glass to press the charge to form an inverted hollow glass parison.

8. Apparatus for forming hollow glassware, comprising a sectional inverted press body mold, an upright sectional blow mold, a sectional neck ring movable between positions below the press body mold and above the blow mold, respectively, a receiver located below and in line with the neck ring when the latter is disposed below the press body mold, said receiver having an upwardly facing opening therein substantially similar in cross section to the opening in the closed neck ring, a pressing plunger mounted to move vertically in said receiver and through the neck ring into said press body mold, said plunger having a tip of smaller cross section than the interior of the receiver, means for moving the plunger, glass feeding means for delivering a plurality of similar charges of molten glass in a regular succession so that each moves downwardly from the feeding means through the closed neck ring onto the tip of the plunger in the receiver, means acting in timed relation to the delivery of each of said charges to close the press body mold above the neck ring and receiver quickly after downward movement of each such charge into the underlying receiver, to move the plunger upwardly before the charge has settled into good heat transferring contact with the receiver so as to raise the charge into the press mold and neck ring and to press it therein, thereafter to withdraw the plunger, to open the press body mold, to move the neck ring to transfer the parison to the open blow mold, to close the blow mold, to open and close the neck ring and to return it in closed condition to its position above the receiver, and means for expanding the parison to final form in the blow mold.

9. Apparatus for supplying charges of molten glass and forming them into pressed parisons, comprising feeding mechanism constructed, adapted and arranged to deliver uniform charges of molten glass downwardly from the feeding mechanism, an inverted parison mold having a neck finish portion and comprising separable parts, means for opening and closing said separable mold parts, a pressing plunger mounted for vertical movements upwardly to and downwardly from a raised pressing position at which the plunger extends in the cavity of the inverted parison mold for the greater part of the height of said cavity, and operating means for the feeding mechanism, the mold parts and the pressing plunger constructed and arranged to operate them to deliver each charge through at least a portion of the cavity of the inverted parison mold onto the tip of the plunger when the plunger is at a position below its raised pressing position, to close the parison mold promptly after the charge has passed downwardly into the space therewithin before completion of an upward pressing movement of the plunger, and to initiate each upward pressing movement of the pressing plunger from its aforesaid charge receiving position substantially simultaneously with the contact of each charge with the tip of the plunger and before completion of closing of the inverted parison mold.

10. Apparatus for forming a glass parison comprising an open topped upright glass receiver, a neck ring at the upper end thereof, a pressing plunger movable axially in an upward direction from a lower retracted position in said charge receiver through the neck ring to position to project above the neck ring, an inverted parison press mold located above the neck ring in cooperative relation therewith and comprising at least one part movable from position to cooperate with the remainder thereof to permit passage of a downwardly moving charge of glass through a space between parts of said parison press mold at least partially through said neck ring into said receiver and onto the pressing plunger in said receiver, and means for operating said pressing plunger and said inverted parison press mold parts to initiate each upward pressing movement of the plunger prior to the closing of said parison press mold after the passage of each charge into the space between parts of said mold.

11. Glass forming apparatus comprising an open topped upright glass receiver, an inverted parison press mold located above and in line with said receiver, a vertically reciprocable upright pressing plunger having an upwardly tapering upper end portion movable axially of the receiver between a lower position at which the upper end of said tapering portion forms a centrally located partial bottom for the receiver and an upper position at which said tapering portion protrudes from the receiver into the cavity of the inverted parison press mold, and means for reciprocating said plunger.

12. Glass forming apparatus comprising an open topped upright glass receiver, an inverted neck ring located at the top of the receiver in axial alignment therewith, the glass forming portion of said neck ring being of greater internal cross-sectional dimensions than the interior of said receiver, an inverted parison press body mold located at the top of said neck ring in axial alignment with the neck ring and the receiver, a vertically reciprocable upright pressing plunger having an upwardly tapering upper end portion movable axially of said receiver, neck ring and parison press body mold between a lower position at which the tapering upper end portion of the plunger may be disposed entirely below the cavity of said parison press body mold to a higher position at which said tapering upper end portion extends through said neck ring into the cavity of said body mold.

13. Glass forming apparatus, comprising an open topped upright glass receiver, an inverted neck ring at the upper end thereof, an inverted parison press mold above the neck ring, a pressing plunger movable axially between a lower retracted position in the charge receiver and a raised pressing position at which the plunger extends through the neck ring into the inverted press mold, and means for applying pressure fluid to the interior of the glass receiver around the tip portion of the pressing plunger.

14. Glass forming apparatus comprising an open topped upright glass receiver, an inverted neck ring at the upper end thereof, an inverted parison press mold above the neck ring, an axially movable vertical pressing plunger having an upwardly tapering tip portion and adapted to be moved from a lower retracted position partially or completely in the receiver upwardly in supporting contact with a charge of glass thereon to raise part or all of said charge through the inverted neck ring into the inverted parison press mold to press said charge to the shape of the combined cavities of said inverted parison press mold and inverted neck ring, and means for applying a lubricating fluid medium to the interior of the receiver.

15. Glass forming apparatus comprising an open topped upright glass receiver, an inverted neck ring at the upper end thereof, an inverted parison press mold above the neck ring, an axially movable vertical pressing plunger having an upwardly tapering tip portion and adapted to be moved from a lower retracted position partially or completely in the receiver upwardly in supporting contact with a charge of glass thereon to raise part or all of said charge through the inverted neck ring into the inverted parison press mold to press said charge to the shape of the combined cavities of said inverted parison press mold and inverted neck ring, and means for applying pressure fluid around the tip portion of the raised plunger to obviate partial vacuum in the internal cavity of the pressed glass parison in said inverted parison press mold and neck ring when the plunger is withdrawn from contact with such glass and to maintain internal pressure on the walls of the pressed glass parison for a predetermined period during and after the withdrawal of said plunger.

16. The herein described method of making articles of blown glassware, which consists in producing a regular succession of charges of molten glass, by the operation of a feeder, each charge moving downwardly from the feeder as an entity of suitable size, shape and thermal and physical conditions for subsequent fabrication into the article desired, practically simultaneously checking the downward movement of the charge and applying an upwardly directed motive force to the charge restricted initially to the central portion only of the original lower end surface of the charge and thereafter to glass at the interior of the charge and effective quickly to reverse the direction of movement of the charge as an entity and to press the glass thereof from within the charge into molding contact at its exterior with the walls of the molding cavity of an inverted parison press mold, and thereafter forming the hollow parison thus produced into the article of blown glassware desired.

17. The herein described method of making articles of blown glassware, which consists in producing a regular succession of charges of molten glass, by the operation of a feeder, each charge moving downwardly from the feeder as an entity of suitable size, shape and thermal and physical conditions for subsequent fabrication into the article desired, practically simultaneously checking the downward movement of the charge and applying an upwardly directed motive force to the charge restricted initially to the central portion only of the original lower end surface of the charge and thereafter to glass at the interior of the charge and effective quickly to reverse the direction of movement of the charge as an entity and to press the glass thereof from within the charge into molding contact at its exterior with the walls of the molding cavity of an inverted parison press mold, permitting the inverted hollow parison thus produced to reheat for a selected time in its inverted position, reverting the hollow parison and depositing it in an upright blow mold, permitting said hollow parison to reheat and elongate by gravity in said blow mold and then blowing the reheated and elongated parison to the shape of the cavity of the blow mold to produce the final article desired.

18. The method of producing a glass parison having a hollow body formed with a neck finish at one end thereof which comprises delivering a charge of molten glass downwardly from a feeder as a moving entity, checking the downward movement of the charge at a predetermined level, thrusting a pressing plunger upwardly into the charge axially thereof in contact initially with the central portion only of the glass surface at the end of the charge at which the neck finish portion of the parison subsequently is to be formed and thereafter in contact only with glass at the interior of the charge quickly to raise said charge as an entity and to force the glass thereof from within the charge into molding contact with the walls of the cavity of an inverted press mold having a neck finish forming portion at its lower end, and preventing substantial heat transferring contact of the glass of the charge with any external heat extracting surface continuously from the delivery of said charge downwardly from said feeder to said molding contact of the charge with the walls of the cavity of said inverted press mold.

19. The method of forming a glass parison having a hollow body and a neck finish portion at one end of said body, which comprises delivering a charge of molten glass downwardly as an entity through a temporary opening at the upper end of an inverted parison press mold having a neck finish forming portion at its lower end into said press mold, checking the downward movement of said charge within said press mold at a level above said neck finish forming portion thereof by a tapering upper end portion of an upright vertically movable pressing plunger projecting through said neck finish forming portion so as to contact the downwardly moving charge initially at the central portion only of its lower end surface and subsequently only at the interior of the charge, raising the charge as an entity in the space within said parison press mold by moving said plunger axially upward within said space with the tapering upper end portion of the plunger in supporting contact with the glass at the interior of the charge and before glass at the periphery of the charge has descended on said plunger end into the neck finish forming portion of said press mold, closing said temporary opening at the top of said inverted parison press mold to close the molding cavity of said parison press mold at its top before any glass of the charge has been raised to the level of said opening, and continuing said upward movement of said plunger in supporting contact with glass at the interior of said charge to press from within the charge some of the glass thereof into molding contact with the wall of said molding cavity of the inverted parison press mold and to displace the remaining glass of said charge downwardly around said upwardly moving plunger into the neck finish portion of said mold to form a neck finish portion at the lower end of the hollow body of said parison during the concluding part of the upward pressing movement of said plunger.

20. The method of forming a hollow glass parison having a neck finish portion, comprising the steps of delivering a charge of glass as an entity downwardly into a molding unit comprising an inverted parison body mold and a cooperative inverted neck ring, substantially simultaneously checking the downward movement of the charge within the inverted parison body mold and thrusting a pressing plunger upwardly in said molding unit in contact only with glass at the interior of the charge to move said charge upwardly as an entity in said molding unit before any glass of the charge has engaged any neck finish molding surface of the neck ring portion of said unit, continuing the upward movement of the plunger in contact with glass at the interior of the charge quickly to press the charge from within to an external shape corresponding with that of the combined cavities of the inverted parison body mold and the inverted neck ring of said molding unit and to an internal shape corresponding with that of the surface of the portion of the plunger extending into said molding unit.

21. The method of forming a hollow parison which comprises delivering a charge of glass as an entity axially onto a tapering upper end portion of an upright upwardly movable pressing plunger, preventing further downward movement of the charge as an entity relative to the plunger by the contact of the upper end portion of said plunger with glass at the interior only of said charge so as to leave all the glass at the outer periphery of the charge free to shift downwardly by gravity on said plunger, lifting said charge as an entity within an inverted parison press mold by moving said plunger and the charge thereon upwardly in the cavity of said mold, and continuing said upward movement of the plunger in the cavity of said press mold to the extent required to press all the glass of the charge into hollow form between the plunger and the wall of the cavity of said inverted parison press mold.

22. The method of forming a hollow parison which comprises delivering a charge of molten glass as an entity moving downwardly from a feeder within the cavity of an inverted parison body mold, checking the downward movement of said charge within said body mold at a level above the cavity of a cooperative neck mold at the lower end of said body mold, and moving said charge as an entity upwardly from said level by a pressing plunger in contact with only glass at the interior of the charge to press from within the charge part of the glass thereof against the walls of the cavity of the body mold to form a hollow parison body and to displace the remaining glass of the charge downwardly into the neck mold to form a neck finish portion of said parison as the concluding part of the pressing operation.

23. The method of forming a hollow parison which comprises delivering a charge of molten glass as an entity moving downwardly from a feeder into the combined cavities of an inverted parison press body mold and a neck mold of a molding unit, checking the downward movement of said charge at a level above that of the portion of the neck mold in which glass of the charge is later to be given a neck finish, raising said charge as an entity from said level within the molding unit, preventing contact of any portion of said charge with any wall of the neck finish forming portion of said neck mold prior to the raising of said charge within the molding unit, and pressing from within the charge part of the glass thereof against the wall of the inverted body mold and forcing the remainder of the glass of the charge downwardly into the cavity of the neck mold to form in said molding unit in the order named an inverted hollow parison body and a neck finish portion of the parison at the lower end of said hollow body.

24. Apparatus for forming glassware comprising an inverted parison press mold having a neck finish forming portion at its lower end and a body portion thereabove open at its top to receive a falling charge of molten glass, a baffle for closing the body portion of the inverted parison press mold at its top after the descent of the charge into said body portion, a vertically reciprocable pressing plunger having a tapering upper end portion extending into the inverted parison press mold from below in axial alignment with said mold, an operating mechanism for the plunger constructed and arranged to cause the plunger to check the descent of the mold charge within said inverted parison press mold at a level sufficiently high to prevent any glass of the charge from moving into the neck finish portion of the mold at that time and quickly thereafter to raise the charge by an upward movement of the plunger effective to press glass of the charge from within against the internal walls of the parison press mold above the neck finish forming portion to form a hollow parison body, and at the conclusion of such pressing operation to force glass of the charge downwardly into the neck finish forming portion to form a neck finish on and at the lower end of said hollow parison body.

GEORGE E. ROWE.